(12) United States Patent
Franchet et al.

(10) Patent No.: US 7,837,139 B2
(45) Date of Patent: Nov. 23, 2010

(54) TUBULAR PART THAT INCLUDES AN INSERT MADE OF A METAL MATRIX COMPOSITE

(75) Inventors: Jean-Michel Patrick Maurice Franchet, Paris (FR); Gilles Charles Casimir Klein, Mery sur Oise (FR); Louis Salvat, Tignieu Jameyzieu (FR)

(73) Assignee: Snecma, Paris (FR)

( * ) Notice: Subject to any disclaimer, the term of this patent is extended or adjusted under 35 U.S.C. 154(b) by 317 days.

(21) Appl. No.: 12/018,525

(22) Filed: Jan. 23, 2008

(65) Prior Publication Data

US 2008/0210365 A1 Sep. 4, 2008

(30) Foreign Application Priority Data

Jan. 23, 2007 (FR) .................................. 07 00451

(51) Int. Cl.
*B21C 47/02* (2006.01)
(52) U.S. Cl. ................... 242/444; 242/438; 242/448
(58) Field of Classification Search ............. 242/437, 242/437.3, 438, 443, 443.1, 444, 445.1, 447.3, 242/448
See application file for complete search history.

(56) References Cited

U.S. PATENT DOCUMENTS

| | | | | |
|---|---|---|---|---|
| 3,631,897 A | * | 1/1972 | Fischer et al. ............... | 138/141 |
| 3,886,029 A | * | 5/1975 | Poulsen ....................... | 242/444 |
| 4,010,054 A | * | 3/1977 | Bradt .......................... | 156/173 |
| 4,137,119 A | | 1/1979 | Piola | |
| 4,251,036 A | * | 2/1981 | McLain ....................... | 242/444 |
| 4,822,444 A | | 4/1989 | Weingart et al. | |
| 5,705,122 A | * | 1/1998 | Curran ........................ | 264/625 |
| 5,897,729 A | * | 4/1999 | Bikson et al. ................ | 156/172 |
| 7,131,308 B2 | * | 11/2006 | McCullough et al. ......... | 72/258 |
| 7,507,935 B2 | * | 3/2009 | Franchet et al. ......... | 219/121.64 |
| 7,511,248 B2 | * | 3/2009 | Franchet et al. ......... | 219/121.64 |
| 2006/0060325 A1 | * | 3/2006 | Gordon et al. ................ | 164/98 |
| 2007/0045251 A1 | * | 3/2007 | Franchet et al. ......... | 219/121.64 |
| 2008/0318042 A1 | * | 12/2008 | Kusek ......................... | 428/378 |

FOREIGN PATENT DOCUMENTS

| | | |
|---|---|---|
| DE | 40 21 547 A1 | 1/1992 |
| EP | 0 931 846 A1 | 7/1999 |
| EP | 1 726 678 A1 | 11/2006 |

OTHER PUBLICATIONS

U.S. Appl. No. 12/670,786, filed Jan. 26, 2010, Dunleavy, et al.
U.S. Appl. No. 12/670,767, filed Jan. 26, 2010, Dunleavy, et al.

* cited by examiner

*Primary Examiner*—Emmanuel M Marcelo
(74) *Attorney, Agent, or Firm*—Oblon, Spivak, McClelland, Maier & Neustadt, L.L.P.

(57) ABSTRACT

The invention relates to a process for manufacturing a tubular part, which includes an insert made of a metal matrix composite and within which ceramic fibers extend. The process comprises the following steps:
  the filaments of a filament bundle are fixed close to one end of a support part, said filaments being separate from one another and each filament comprising a ceramic fiber coated with a metal sheath; and
  all the filaments of the bundle are wound around the support part along a helical path.

13 Claims, 1 Drawing Sheet

TUBULAR PART THAT INCLUDES AN INSERT MADE OF A METAL MATRIX COMPOSITE

BACKGROUND OF THE INVENTION

The invention relates to the manufacture of a tubular part that includes an insert made of a metal matrix composite.

In the field of aeronautics in particular, a constant objective is to optimize the strength of parts for a minimal mass and minimal size. Thus, certain parts may hereafter include an insert made of a metal matrix composite. Such a composite comprises a metal alloy matrix, for example a titanium (Ti) alloy matrix, in which fibers extend, for example silicon carbide (SiC) ceramic fibers. Such fibers have a tensile strength well above that of titanium (typically, 4000 MPa as opposed to 1000 MPa). It is therefore the fibers that take up the loads, the metal alloy matrix providing the function of binding with the rest of the part and also the function of protecting and insulating the fibers, which must not come into contact with one another. Furthermore, ceramic fibers are resistant to erosion but must necessarily be reinforced by metal.

These composites may be used in the manufacture of disks, shafts, cylinder actuator bodies, casings, spacers, such as reinforcements for monolithic parts such as blades, etc. The dimensions, especially the thickness, and the mass of these parts may thus be considerably reduced. To give an example, a blade-supporting disk may be reduced to a simple ring.

To obtain such an insert made of a composite, filaments called "coated filaments", each comprising a ceramic fiber coated with metal, are formed beforehand. The metal gives the filament the elasticity and flexibility necessary for being handled. Preferably, a very thin carbon or tungsten filament lies at the center of the fiber, along its axis. This carbon filament is coated with silicon carbide, while a thin layer of carbon is interposed between the fiber and the metal so as to provide a diffusion barrier/buffer function during the differential thermal relaxation that occurs upon cooling the liquid metal deposited on the fiber.

DESCRIPTION OF THE PRIOR ART

The manufacture of composite filaments, or treated filaments, may be carried out in various ways, for example by metal vapor deposition in an electric field, by electrophoresis starting with a metal powder, or else by coating ceramic fibers by dipping them into a bath of liquid metal. Such a process for coating ceramic fibers, by dipping them into a liquid metal, is disclosed in Patent EP 0 931 846, in the name of the Applicant. The manufacture of the filaments using this process is rapid. Composite filaments, or coated filaments, are thus obtained which serve as the basis for the manufacture of the composite insert that will be included in the part.

The invention applies more particularly to the manufacture of a substantially tubular part that includes an insert made of a metal matrix composite. This is for example a turbomachine rotor shaft. The prior art provides various processes for forming such a part.

According to a first process, disks, each formed from a coated filament wound in a spiral which is consolidated by a bonding agent, are stacked one on top of another in a container. The bonding agent is then eliminated, so as to avoid any contamination of the titanium, and then the container is closed and compacted by hot isostatic pressing so as to obtain a part with an insert made of a composite. Such a process is lengthy and complicated to implement. It is also ill suited to the formation of a tubular part. This is because it is necessary to form and then stack a large number of disks in order to obtain the part. Moreover, in a turbo jet rotor shaft for example, the resultant of the stresses and of the various stressing modes (centrifugal, tensile, torsional, compressive, etc.) has at least one longitudinal component, since the shaft works mainly in torsion. Now, the ceramic fibers take up the loads tangential to the axis (which is curvilinear) along which said fibers extend, in other words mechanical properties of the coated filaments are high along their longitudinal direction. However, when wound as a spiral as in the process that has just been described, the filaments can take up only transverse loads.

Another process has been envisioned, which proposes to thread, into a sheath, coated filaments in the form of rods, which are mutually parallel and extend longitudinally between two tubes forming the sheath, and then subjecting the whole assembly to hot isostatic pressing. If it is desired for the filaments to extend, not parallel to the axis of the shaft, but at an angle thereto, the filaments are fastened to disks placed on either side of the sheaths and these disks are rotated about their axis, in opposite directions to each other. In a process of this type, installing the coated filaments proves to be very tricky, if not impossible, for the last filaments if it is desired to have a high density of coated filaments. Moreover, the risk of wrongly positioning the filaments, which damages them and impairs the behavior of the part, is high.

To alleviate these problems, the Applicant has proposed, in French Patent Application filed under the number FR 05/51406, a process that includes a step of laying up a bonded sheet of coated filaments around a metal support part. Such a process allows tubular parts to be produced on an industrial scale, while still choosing the angle that the coated filaments make with the axis of the part, thanks to the angle at which the sheet is laid up around the support part.

Such a process may be further improved since a sheet of coated filaments has a certain rigidity which, in certain cases, may be a problem for laying it up. Moreover, since the filaments are bonded together, they are not free to follow a separate path but are influenced in their movement by the neighboring filaments.

SUMMARY OF THE INVENTION

The object of the invention is to provide a process for forming a tubular part with an insert made of a metal matrix composite, which is effective and simple to implement on an industrial scale.

For this purpose, the invention relates to a process for manufacturing a tubular part, which includes an insert made of a metal matrix composite and within which ceramic fibers extend, which process comprises the following steps:

the filaments of a filament bundle are fixed close to one end of a support part, said filaments being separate from one another and each filament comprising a ceramic fiber coated with a metal sheath; and all the filaments of the bundle are wound around the support part along a helical path, in which the filaments are wound around the support part by a die, which is placed around the support part and driven translationally along its axis, the support part being driven rotationally around its axis.

Thanks to the invention, a tubular part may be formed on an industrial scale. Since the filaments are separate from one another and all wound together, they are wound, and placed individually, around the support part without any stress. Moreover, since the filaments are wound along a helical path, the fibers extend around the support part at an angle to its axis, which is easy to adjust so that the fibers will properly take up the loads to which the part will be subjected. The process of the invention also makes it possible to control the way in which the coated filaments are wound on the support on leaving the die. This is because, since it is the die that moves translationally around the support, the latter remaining translationally stationary but being driven rotationally, the tension of the filaments is controlled and the already wound filaments are held "in compression" on the support, something which would not be the case if it were the support that moved (as the filaments would be in tension on leaving the winding). The filaments are thus well juxtaposed one in relation to another.

The process of the invention is particularly well suited to the winding of filaments coated with a titanium alloy. This is because, as the melting point of titanium is around 1750° C., it is not conceivable to combine a coating of the filaments and their winding on a support—it being necessary to precoat the fibers, to allow them to dry and then to wind them on the support. The process of the invention allows such fibers to be placed on a support.

It should be noted that when it is specified, in the process, that the filaments of the filament bundle are fixed close to one end of the support part, the filaments may be fixed either directly to the support part or to a stationary part separate from the support part, near the end of the latter.

According to one implementation, the die is also driven rotationally about the axis of the support part.

The invention also relates to an installation for manufacturing a tubular part, which includes an insert made of a metal matrix composite and within which ceramic fibers extend, which installation comprises a module for forming a bundle of coated filaments, these being separate from one another, each filament comprising a ceramic fiber coated with a metal sheath, means for fixing the filaments close to one end of a support part, and winding means, for winding all of the filaments of the bundle around the support part along a helical path, the winding means comprising a die suitable for being placed around the support part and driven translationally along its axis, the installation being designed to drive the support part rotationally about its axis.

According to one embodiment, the module for forming a bundle of coated filaments comprises two plates each drilled with a plurality of holes.

Advantageously in this case, each hole has a sleeve for guiding the filaments, which is designed to fulfill two functions, namely to protect the filaments and to participate in tensioning the filaments.

Also advantageously, the sleeves are made of rubber.

According to one embodiment, the die is designed to be also rotationally driven about the axis of the support part.

BRIEF DESCRIPTION OF THE DRAWINGS

The invention will be better understood on reading the description of the preferred implementation of the process and the preferred embodiment of the installation of the invention, with reference to the appended drawings in which.

DESCRIPTION OF THE PREFERRED EMBODIMENTS

Figure 1:
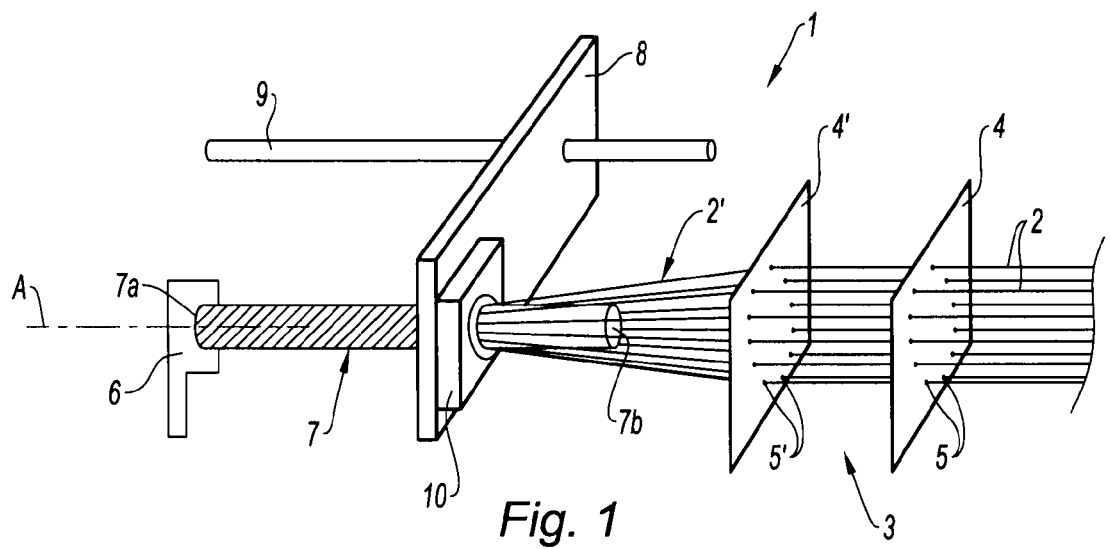
FIG. 1 is a schematic perspective view of a portion of the preferred embodiment of the installation of the invention while a bundle of coated filaments are being wound.

An installation 1 for implementing the process of the invention will firstly be described.

The installation 1 comprises a device 6 for holding in place a support piece 7 for coated filaments, this being called hereinafter support piece 7. the support piece 7 here has the form of a shaft, of axis A. The holding device 6 retains the support piece 7 via a first end 7a. This holding device 6 here is designed to retain the support piece 7 via its end 7a without any other holding means being necessary. In particular, the support piece 7 is not supported at its second end 7b. According to another embodiment, a tailstock is provided for holding the support piece 7 at its other end.

In the embodiment described, the device 6 for holding the support piece 7 is a chuck 6, of the machining lathe chuck type. The chuck 6 is designed to rotate the support piece 7 about its axis A.

Figure 2:
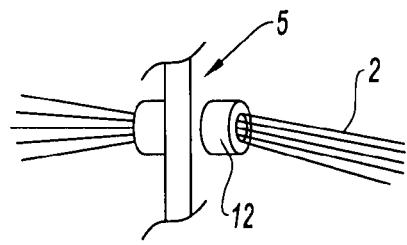
FIG. 2 is a detail view, in schematic perspective, of a hole of FIG. 1.

The installation 1 includes a module of bobbins of coated filaments 2 (this not being shown) which allows the coated filaments 2 to be paid out to a module for tensioning the coated filaments 2 (again not shown). Starting from the tensioning module, the filaments are paid out to a coated-filament distribution module 3 comprising two plates 4, 4', each drilled with a plurality of holes 5, 5' distributed in the form of a circle on the plate 4, 4'. The plates 4, 4' are arranged in such a way that the holes 5,5' in one of them face the holes 5,5' in the other. The holes 5,5' are intended to guide the coated filaments 2 or packets of coated filaments 2. Referring to FIG. 2, each hole 5,5' has a sleeve 12 for guiding a filament 2 or a packet of filaments 2, in this case a packet of filaments 2. The sleeves 12 are made of rubber so as to fulfill, apart from a guiding function, two other functions, namely to protect the coated filaments 2 and to participate in tensioning the filaments 2 and in controlling this tension, since the rubber generates a frictional force on the filaments 2.

Upon leaving the distribution module 3, the coated filaments 2 are in the form of an annular bundle 2' of coated filaments 2. The function of the distribution module is therefore to form (and distribute) a bundle 2' of coated filaments 2. The term "distribution module 3" and the term "module 3 for forming a bundle 2' of coated filaments 2" are used interchangeably. This is either a bundle 2' of as many coated filaments 2 as there are holes 5,5', in the case in which a single filament 2 is guided by each hole 5,5', or a bundle 2' of as many packets of coated filaments 2 as there are holes 5,5'. The number of filaments 2 is chosen so that the filaments 2 can cover the entire developed surface of the support piece 7. In the embodiment described, for a support piece 7 with a diameter of 100 mm, thirty packets of forty filaments 2 are provided. Thus, the plates 4,4' have thirty holes 5,5', a packet of forty filaments 2 passing through each hole 5,5'.

The installation 1 includes a movable support arm 8, drawn translationally along a spindle 9 parallel to the axis A of the support piece 7. The support arm 8 supports a die 10 placed around the support piece 7 of axis A common thereto. The function of the translationally driven die 10 is to wind the coated filaments 2 around the support piece 7, which is rotationally driven, so as to form a helical winding of the coated filaments 2 on the support piece 7. In the embodiment described, the die 10 is also driven rotationally about its axis A, for example by a belt system. This allows the filaments 2 to be placed even better on the support piece 7.

Figure 3:
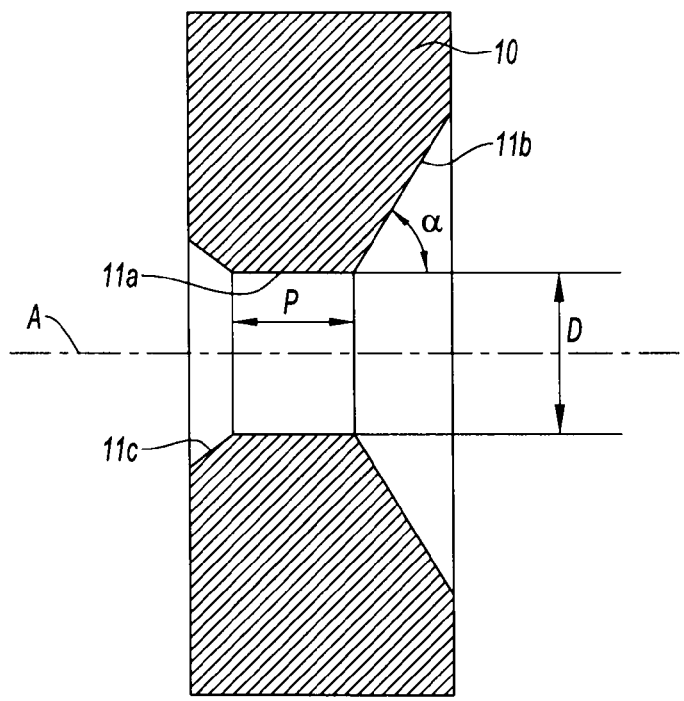
FIG. 3 shows a sectional view of the die of the preferred embodiment of the installation of the invention.

Referring to FIG. 3, the die 10 has, in its central part, a cylindrical passage 11a of diameter D slightly larger than the diameter of the support piece 7, so as to let the support piece and the coated filaments 2 pass through it, which it guides and stresses slightly on the support piece 7. Preferably, this diameter D is equal to the diameter of the support piece plus 2.1 to 2.5 times the diameter of a filament in the case in which a single layer of filaments is wound onto the support piece 7. The land P of this passage 11a, that is to say the length of the passage 11a, is dimensioned according to the stress to which it is desired to submit the filaments 2. Preferably, this land is between 20 and 30% of the diameter of the support piece 7. At the entry of the die 10, the latter has a flared portion 11b, here frustoconical, which will be called the introduction portion 11b, the angle α of which, relative to the axis A of the die 10, depends on the number of coated filaments 2 that are wound by the die 10. At the exit of the die 10, the latter also has a flared portion 11c, here frustoconical, the main function of which is to relax the stresses on the coated filaments 2.

The function of the die 10 is to wind the coated filaments 2 onto the support piece 7. As the die is moved translationally while the support piece is rotated, it forces the filaments 2 to be wound along a helical path.

The process for forming a tubular part with a composite insert will now be described in greater detail.

The coated filaments 2 are formed using one of the known techniques, for example by a process of coating ceramic fibers, by dip coating them in a bath of liquid metal. These filaments 2 are wound on a bobbin. Each filament 2 has for example a diameter of 0.2 to 0.3 mm. A plurality of bobbins, each with one or more coated filaments 2 wound on its circumference, are placed on a bobbin module (not shown). This module allows the bobbins to be placed in such a way that they can be paid out toward the tensioning module and the distribution module 3 without the filaments 2 crossing one another.

According to the embodiment described, it is a packet of coated filaments 2 that is wound on each bobbin. In other words, a plurality of coated filaments 2, placed in a packet, that is to say juxtaposed with one another but separate from one another, are wound together on each bobbin. Such bobbins allow the formation of a bundle of packets of filaments 2 and then the winding of these filaments around the support piece 7. A person skilled in the art will readily transpose this to the case in which the filaments of a bundle of individual filaments 2 are wound around the support piece 7.

The packets of coated filaments 2 are paid out to the tensioning module and then to the distribution module 3. Note that with a suitable arrangement, the tensioning module may be integrated into the bobbin module.

Each packet of filaments 2 is introduced into a hole 5 in the first plate 4 of the distribution module 3, from which it emerges, going to a hole 5' in the second plate 4' facing the first hole 5. An annular bundle 2' of packets of filaments 2 is thus formed.

The packets of filaments 2 are conveyed to the first end 7a of the support piece 7, that is to say that end of the support piece 7 furthest away from the distribution module 3. The filaments are blocked or fixed at this end 7a. Here, the end of these filaments 2 is fixed, but it would be possible to fix a part of the filaments 2 that is not the end thereof. This fixing may be achieved in any manner. As will be seen later, this fixed end portion of filaments 2 will subsequently be eliminated and will not form a portion of the final part. The filaments 2 may be fixed by welding, brazing or any other mechanical fixing means. Referring to one particular embodiment, the filaments 2 are not fixed to the end 7a of the support piece 7 but near the latter, on another stationary piece. The essential point is that the filaments 2 are blocked near the end of the support piece 7 so as to be suitably wound thereonto. We note also that French Patent Application filed under the number FR 05/51406 discloses a method of welding the coated filaments by electrodes. Such a method may be used either just for fixing the filaments 2 to the end 7a of the support piece 7, or to form a weld line on the filaments 2 along the support piece 7, for example with an electrode welding device that follows the translational movement of the die 10 or that follows a helical path.

Once the filaments have been blocked near the end of the support piece 7, the die 10 is attached around the support piece 7. The support piece 7 is rotated about its axis A, while the die 10 is driven translationally by the support arm 8, and here simultaneously with the rotation about the axis A of the support piece 7. Thus, the packets of filaments 2 of the bundle 2' are wound, along a helical path, around the support piece 7. In other words, the die 10 allows the bundle 2' of packets of filaments 2 to be twisted around the support piece 7, that is to say to wind the filaments 2 all together around the support piece 7, each filament being placed around the support piece 7 individually since it is separate from the others. The filaments 2 are placed naturally beside one another in order to cover the support piece 7. Thanks to the tensioning of the filaments 2 by the die 10, the distribution module 3, the tensioning module and the bobbin module, the filaments 2 remain pressed in position on the support piece 7.

The angle that the coated filaments 2 make with the axis A of the support piece 7 is simply determined by the ratio of the speed of rotation of the support piece 7 (and here of the die 10) to the speed of translational displacement of the die 10 parallel to the axis A of the support piece 7. Here, this angle is chosen to be 45°.

Once the filaments 2 have been wound over the entire support piece 7, they are fixed to the second end 7b of the support piece 7. As in the case of the first end 7a, the method of fastening here is of no great importance and the same fastening methods are conceivable.

The support piece 7 is thus covered with a layer of coated filaments 2 over its entire surface, in a single pass of the die 10. Such a process requires few operations and is easy to implement on an industrial scale. It is possible to wind one or more other additional layers around the support piece 7, using the same process, by adapting the dimensions of the various elements.

In accordance with one particular embodiment, a plurality of layers are wound simultaneously, either with a single die or with suitable successive dies.

In the case in which several layers are wound on the support piece 7, these layers are preferably fastened between adjacent layers, for example by an electrode welding process, referred to above.

Once the desired number of layers has been wound around the support piece 7, the main part is formed. For this purpose, the whole assembly is inserted into a sheath, the inside diameter of which is equal to the outside diameter of this assembly. This sheath is made of the same metal alloy as the coating of the fibers of the coated filaments 2, here a titanium alloy. The whole assembly is plugged at each of its ends by circular metal plates so as to take the form of a cylinder. The circular plates and the sheath are preferably welded by electron beam welding, so as to constitute a sealed container. Here, these plates are made of titanium alloy. Electron beam welding makes it possible beforehand to create a vacuum inside the sheath. The whole assembly formed is then compacted by hot isostatic pressing.

During the hot isostatic pressing, which is for example carried out under a pressure of 1000 bar at 950° C., the titanium alloy is made to diffuse and create the metal matrix of the composite, within which the ceramic fibers extend. Since the titanium alloy is viscous at high temperature, it allows a good diffusion flow of material, without damaging the ceramic fibers, during formation of the metal matrix. Thus, in the particular case in question, a shaft is obtained that has an internal thickness of titanium alloy, corresponding to the support piece 7, a central insert made of a titanium alloy matrix composite, in which the ceramic fibers extend helically, and an external titanium alloy thickness corresponding to the sheath.

The ends of the shaft, corresponding to the portions of the filaments 2 that are fixed to the support piece 7, are then machined so as to be discarded. The shaft obtained is therefore uniform over its entire length, with the ceramic fibers making a constant angle to the axis A of the shaft. According to another embodiment, the corresponding portions are discarded before the addition of metal plates at the ends, which is carried out before the hot isostatic pressing. In this case, it is necessary to ensure that the filaments 2 are held in position on the support piece after the ends have been discarded. They may for example be held in place by weld lines between the filaments 2 and the support piece 7, especially those obtained by electrode welding, referred to above.

The shaft obtained has the advantage of a very good resistance to loads, because of the composite insert, which allows the overall thickness of its wall to be substantially smaller than that of conventional shafts. This small thickness makes it possible, apart from a considerable weight saving, to have a small size useful in applications requiring the presence of many coaxial shafts. The shaft also has very good corrosion resistance since its base constituent here is a titanium alloy, the corrosion behavior of which is greatly superior to that of steel for example. Without the presence of the ceramic fibers, the titanium alloy alone would however not have sufficient resistance to the loads.

The invention claimed is:

1. A process for manufacturing a tubular part which includes an insert made of a metal matrix composite and within which ceramic fibers extend, the process comprising the steps of:
    fixing filaments of a filament bundle close to one end of a support part, said filaments being separate from one another and each filament comprising a ceramic fiber coated with a metal sheath;
    placing the support part through a cylindrical passage of a die; and
    translating the die along an axis of the support part while the support part is rotated around the axis to wind all the filaments of the bundle around the support part along a helical path.

2. The process as claimed in claim 1, wherein the die is driven rotationally about the axis of the support part.

3. The process as claimed in claim 1, wherein a length of the cylindrical passage is 20% to 30% of a diameter of the support part.

4. The process as claimed in claim 1, wherein the filaments are coated with a titanium alloy prior to being wound around the support part.

5. An installation for manufacturing a tubular part which includes an insert made of a metal matrix composite and within which ceramic fibers extend, the installation comprising:
    a module for forming a bundle of coated filaments, the filaments being separate from one another, each filament comprising a ceramic fiber coated with a metal sheath;
    means for fixing the filaments close to one end of a support part; and
    winding means for winding all of the filaments of the bundle around the support part along a helical path, the winding means comprising a die placed around the support part and driven translationally along an axis of the support part, the installation driving the support part rotationally about the axis.

6. The installation as claimed in claim 5, wherein the module for forming a bundle of coated filaments comprises two plates each drilled with a plurality of holes.

7. The installation as claimed in claim 6, wherein each hole includes a sleeve for guiding the filaments, the sleeve protecting the filaments and tensioning the filaments.

8. The installation as claimed in claim 7, wherein the sleeves are made of rubber.

9. The installation as claimed in claim 5, wherein the die is rotationally driven about the axis of the support part.

10. The installation as claimed in claim 5, wherein the die includes a cylindrical passage in a central part thereof, a length of the cylindrical passage being 20% to 30% of a diameter of the support part.

11. The installation as claimed in claim 5, wherein a diameter of the die is equal to a diameter of the support part plus 2.1 to 2.5 times a diameter of a filament.

12. The installation as claimed in claim 5, wherein the filaments are coated with a titanium alloy prior to being wound around the support part.

13. A process for manufacturing a tubular part including an insert made of a metal matrix composite and within which ceramic fibers extend, the process comprising the steps of:
    fixing filaments of a filament bundle near a first end of a support part, said filaments being separate from one another and each filament comprising a ceramic fiber coated with a metal sheath;
    placing the support part through a cylindrical passage of a die;
    translating the die along an axis of the support part while the support part is rotated around the axis to wind all the filaments of the bundle helically around the support part, wherein the die is driven rotationally about the axis of the support part.

* * * * *